Aug. 20, 1935.  C. E. HATCHER ET AL  2,011,812

VALVE MECHANISM

Filed June 10, 1933

Inventors
Charles M. Hatcher
Craig E. Hatcher
Marinus Christensen
Hardway Rathey
Attorneys Patented Aug. 20, 1935

2,011,812

UNITED STATES PATENT OFFICE 2,011,812

VALVE MECHANISM

Craig E. Hatcher, Marinus Christensen, and Charles M. Hatcher, Victoria, Tex.; said Christensen and said Craig E. Hatcher assignors to said Charles M. Hatcher Application June 10, 1933, Serial No. 675,252

4 Claims. (Cl. 251—144)

This invention relates to valve mechanism.

An object of the invention is to provide a valve mechanism of the character described specially designed for use in slush pumps and for other similar purposes particularly where gritty fluid is to be pumped or handled.

Another object of the invention is to provide a valve mechanism having a novel type of valve seat.

A further object is to provide in valve mechanism a novel valve assembly designed to form a close fitting joint with the seat to prevent leakage.

A still further object is to provide in valve mechanism a novel type of seat assembly including a removable wear ring and a removable guide retained in place by said ring.

Figure 1:
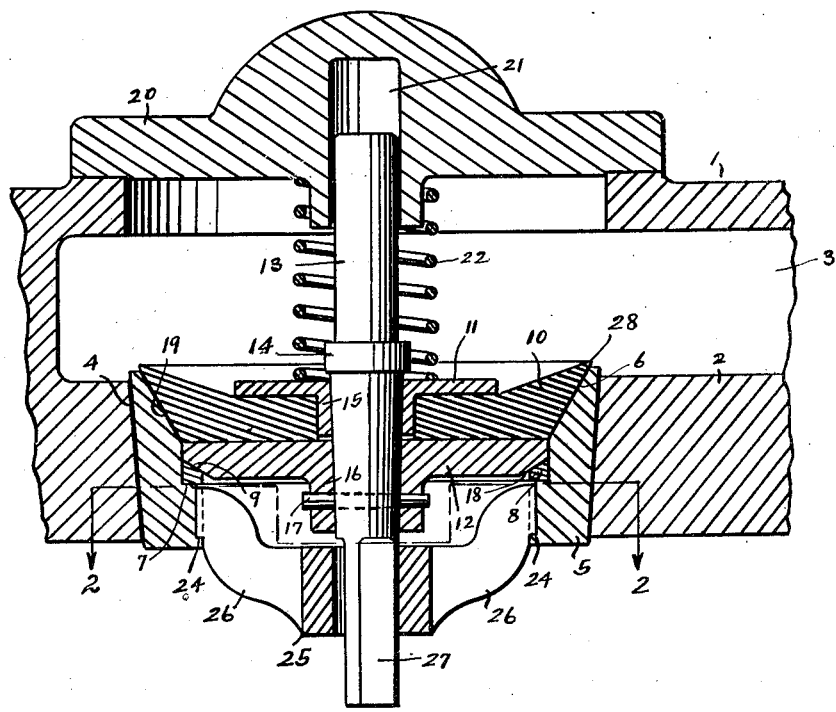
Figure 2:
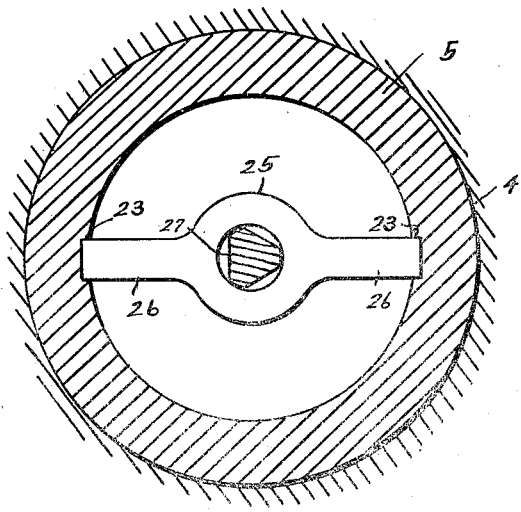

With the above and other objects in view, the invention has particular relation to certain novel features of construction, operation and arrangement of parts an example of which is given in this specification and illustrated in the accompanying drawing, wherein:

Figure 1 shows a vertical sectional view of the valve mechanism as installed in a pump, and Figure 2 shows a cross sectional view taken on the line 2—2 of Figure 1.

Referring now more particularly to the drawing, wherein like numerals of reference designate similar parts, in each of the figures, the numeral 1 designates, generally, a pump having a partition 2 separating the inlet or suction chamber from the discharge chamber 3. The partition 2 has a tapering opening 4 therethrough and driven or otherwise secured in said opening there is the ring 5 whose upper end is flared forming a seat 6. Beneath this seat the ring 5 is contracted inwardly forming an annular shoulder 7 on which is located a removable wear ring 8 whose upper surface is upwardly tapered forming a lower seat 9.

There is a valve assembly comprising the disc 10 and the upper and lower clamp plates 11, 12 between which said disc is clamped. This disc 10 is preferably formed of rubber or other yieldable material and its lower side is formed with a flat face which rests on the plate 12 and the central portion of whose upper side is formed with a flat face on which the plate 11 rests. The valve assembly is mounted on a valve stem 13. Above the plate 11 this stem has an enlarged annular rib 14 thereon and beneath said rib is tapered downwardly. The clamp plates 11, 12 are formed with the depending hubs 15, 16, which have tapering bearings therethrough to receive the tapered lower end of the stem 13. When the parts of the valve assembly are assembled said assembly may be driven onto the tapered portion of the stem 13 and pinned thereon by the cross pin 17 which is driven through aligned bearings in the hub 16 and the stem 13 whereby the resilient disc 10 is securely clamped between the upper and lower plates 11, 12. The plate 12 is of a diameter to fit closely within the ring 5 and at the underside of its outer margin is beveled to form the annular face 18 which conforms to the taper of the seat 9 with which it coacts. The outer margin of the disc 10 is thickened upwardly so that said disc is of a shallow cup-shaped form and said outer margin is upwardly flared or beveled forming the annular face 19 which conforms to the shape of and coacts with the seat 6.

On the pump 1 is a cap 20 having the guide 21 to receive the upper end of the stem 13 and surrounding said stem and interposed between the cap 20 and the clamp plate 11 is a coil spring 22 which normally maintains the valve closed.

The inside of the ring 5 has the vertical grooves 23, 23, extending from the shoulder 7 downwardly but whose lower ends terminate above the lower side of said ring 5 forming the abutments or shoulders 24, 24. There is a spider comprising the central guide 25 and the oppositely extending arms 26, 26, the free ends of said arms projecting into grooves 23, and resting on the shoulders 24, said arms being retained in place by the ring 8.

The lower end of the stem 13 works through said guide 25 and is formed with flat faces as 27, so as to reduce the friction surface between the stem and the guide 25 and so as to provide clearance between said faces and the guide bearing to permit the sand and other gritty substances to readily pass out from between the stem and guide bearing.

Special attention is called to the shape of the valve disc 10, whose outer margin terminates in the annular lip 28. The pressure of the fluid in the chamber 3 acting against said valve disc will tend to spread said disc and cause it to conform to the shape of and to fit closely against the seat 6, notwithstanding any irregularities that may exist in said seat to the end that a tight joint between the disc and seat will be maintained when the valve is closed.

The wear between contacting metal parts of the valve and seat will be in a large measure sustained by the ring 8 and when this ring 8 is worn until it no longer performs its proper function, a new ring may be substituted for it so that the ring 5 need not be replaced but may be used for an indefinite length of time.

The drawing and description disclose what is now considered to be a preferred form of the invention by way of illustration only, while the broad principle of the invention will be defined by the appended claims.

What we claim is:

1. In a valve mechanism a ring having a flared seat and an inside annular shoulder spaced beneath said seat, said ring having inside vertical grooves beneath said shoulder whose lower ends terminate above the lower face of said ring, a spider having a central guide and arms whose outer ends rest in said grooves, a wear ring on said shoulder effective to retain said arms in place.

2. In a valve mechanism a ring having a flared seat and an inside annular shoulder spaced beneath said seat, said ring having inside vertical grooves beneath said shoulder whose lower ends terminate above the lower face of said ring, a spider having a central guide and arms whose outer ends rest in said grooves, a wear ring on said shoulder effective to retain said arms in place, and a valve arranged to cooperate with said seat and having a stem which works through the guide of said spider.

3. In a valve mechanism, a ring having a valve seat and provided with vertical inside grooves beneath the seat whose lower ends terminate above the lower face of the ring, a spider having a central guide and arms whose outer ends rest in said grooves.

4. In a valve mechanism, a ring having a seat and an inside annular shoulder spaced beneath the seat, said ring having inside vertical grooves beneath the shoulder whose lower ends terminate above the lower face of the ring, a spider having a central guide and arms whose outer ends rest in said grooves, a wear ring on the shoulder effective to retain said arms in place and a valve arranged to cooperate with said seat and having a stem which works through the guide of said spider.

CRAIG E. HATCHER.
    MARINUS CHRISTENSEN.
    CHARLES M. HATCHER.